T. WHITTAM.
FRUIT TRIMMER AND SLICER.
APPLICATION FILED SEPT. 7, 1921.

1,408,051.  Patented Feb. 28, 1922.

INVENTOR.
Thomas Whittam.
BY
his ATTORNEY.

UNITED STATES PATENT OFFICE.

THOMAS WHITTAM, OF WEST KENDALL, NEW YORK.

FRUIT TRIMMER AND SLICER.

1,408,051.  Specification of Letters Patent.  Patented Feb. 28, 1922.

Application filed September 7, 1921. Serial No. 499,118.

*To all whom it may concern:*

Be it known that I, THOMAS WHITTAM, of West Kendall, in the county of Orleans and State of New York, have invented certain new and useful Improvements in Fruit Trimmers and Slicers; and I do hereby declare the following to be a full, clear, and exact description of the same, reference being had to the accompanying drawings, forming a part of this specification, and to the reference numerals marked thereon.

This invention relates to devices for removing the core portions and cutting up or slicing fruit such as apples. In preparing apple products it has been a common practice to remove the core portion by subjecting the fruit to the action of a coring implement, such as the tubular knife or blade, well known in the art, and in the same operation or else subsequently to cut up or slice the fruit. In such coring operation, due to various circumstances, the coring implement has been found, in a considerable proportion of instances, to cut eccentrically of the core, or in other words to leave a portion of the core remaining in the apple at one side of the cored opening. According to the principles of the present invention it has been found advantageous to first core the fruit and to subject the imperfectly cored specimens to the action of an efficiently designed trimming implement.

It is one of the objects of the present invention, therefore, to provide a practical and efficient trimming implement of the above character, which may be conveniently associated with the slicing blades, for quickly and cleanly trimming away the remaining core portions, with a minimum wastage of fruit substance and increased freedom of the product from the seeds and husks of the core. To these and other ends the invention resides in certain improvements and combinations of parts all as will hereinafter be more fully described, the novel features being pointed out in the claims at the end of the specification.

Figure 4:
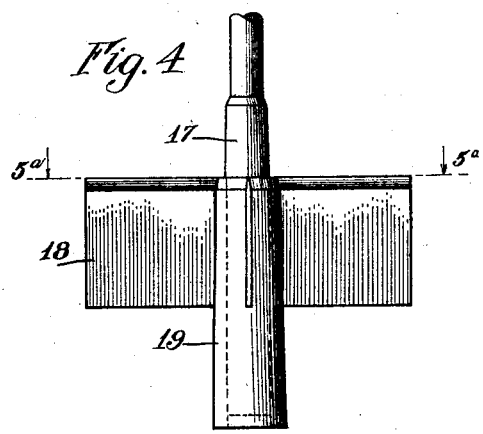
Figure 4 is a side elevation of a modified form of the invention.
Figure 5:
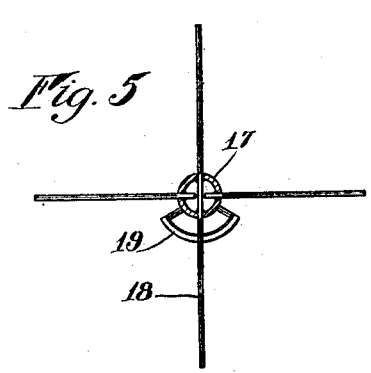
Figure 6:
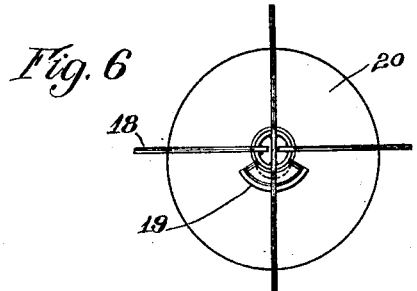

Figure 5 the sectional plan view of the same on line 5ª—5ª of Figure 4;

Figure 6 is a top plan view of the same as applied to the fruit.

Similar reference numerals throughout the several views indicate the same parts.

Figure 1:
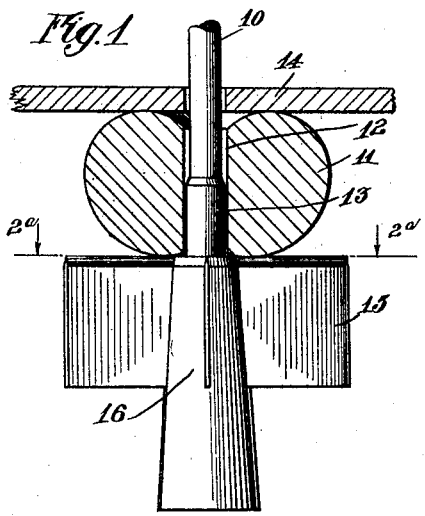
Figure 1 is a side elevation of a device embodying the present invention and illustrating the method of using the same.

The invention comprises, preferably, a cylindrical stem portion indicated generally at 10, Figure 1, the upper end of which is somewhat smaller in diameter than the usual opening cut by a coring implement in the fruit. At 11 is shown an apple which has been previously cored as at 12 and placed on the stem, the upper end of which readily enters the cored opening 12. The stem is enlarged below as at 13 to substantially fit the cored opening and guide the apple to proper position for cooperation with the implement. The upper end of the enlarged portion 13 is beveled as shown to facilitate entrance into the core opening, the apple being placed on the stem at its upper end and slid downwardly to the position shown as well understood in the art and any suitable means such as the reciprocable plate-like member 14 may be provided for forcing the apple against the cutting elements.

In the present instance the trimming element or blade is associated with the usual plurality of radial slicing blades, 15, so that the trimming and slicing operations may be expeditiously performed at the same time. The stem portion described above is preferably constructed of sheet metal tubing as shown and the slicing blades 15 have their inner ends inserted and secured in openings in the stem portion 13. The slicing blades are shown in the present instance as parallel with the stem and extending radially of the latter with their upper edges lying in the same plane and sharpened to cut the fruit.

The trimming element comprises a curved blade located on one side of the stem portion 13 in spaced relation with the latter and arranged in the present embodiment to extend in the form of a circular arc concentric with the axis of the stem.

In the form of the invention, shown in

Figure 2:
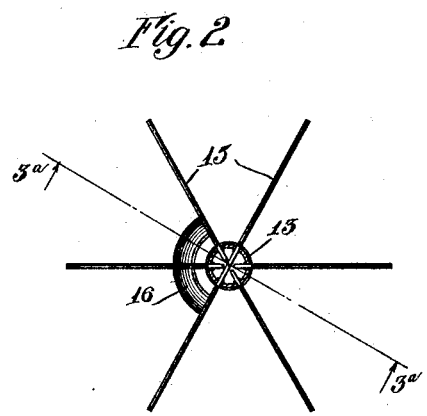
Figure 2 is a sectional plan view of the same on the line 2ª—2ª of Figure 1.
Figure 3:
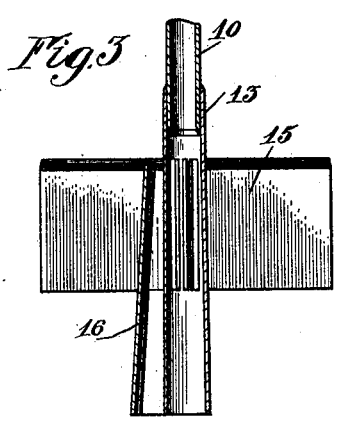
Figure 3 is a sectional elevation on the line 3ª—3ª of Figure 2.

Figures 1 to 3, the trimming blade extends between and is fixed to and supported by three of the six slicing blades, with its upper edge suitably sharpened and lying in the plane of the cutting edges of the slicing blades. As shown the trimming blade is inclined outwardly away from the stem in the direction of the movement of the fruit for the purpose of affording clearance for readily discharging the portions trimmed from the core opening. It is apparent from the above descripton that an apple which has been imperfectly cored or in other words which has a portion of the core remaining on the apple at one side of the cored opening may be placed on the stem and forced downwardly with the remaining core portion in alignment with the trimming blade 16. As the apple is moved downwardly it is centered and guided by cooperation of the stem portion 13 with the cored opening 12 and the trimming blade is arranged to trim off cleanly and remove a thin slice of the fruit at one side of the cored opening sufficient to remove the remaining cored portion. The apple is simultaneously cut into slices by the slicing blades.

In Figures 4 to 6 inclusive is shown a modified form of the invention in which the stem portion 17 carries but four slicing blades 18 instead of six, with a similar trimming blade 19 associated therewith. This trimming blade also is arcuate in shape and inclined for clearance relative to the stem as described above, and in this instance the blade 19 is fixed adjacent its center to one of the trimming blades with its ends connected with the stem. The construction shown in this modification is more particularly adapted for fruit of smaller sizes. At 20, Figure 6, is shown in plan view an apple which has been cored eccentrically and for this or other reasons has had a portion of the core left at one side of the cored opening, with an illustration of the application of the present implement thereto.

In operation the device is preferably supported in any suitable manner in a stationary position and the imperfectly cored specimens of fruit are selected and placed on the upper end of the stem portion with the remaining core portion in alignment with the trimming blade. The apples are forced downwardly by any suitable implement such as indicated at 14 and are simultaneously trimmed and sliced in the manner described, succeeding apples forcing the preceding apples completely past the trimming and slicing blades. Obviously different numbers of slicing blades may be employed and differently constructed and arranged, and the trimming blade may be given different curved shapes and different lengths although the shapes and lengths described above have been found preferable.

The device is simple and practical in construction and affords a convenient and efficient means for quickly and cleanly trimming the cored opening of the fruit, with the result that the objectionable core portions, which tend to reduce the quality of the product, are effectively eliminated with a minimum wastage of fruit substance.

I claim as my invention:

1. A device for trimming cored fruit comprising a stem portion for insertion in the cored opening in the fruit and a trimming blade on one side of and spaced from said stem and extending in an arc part way across the latter for trimming one side of the cored opening.

2. A device for trimming cored fruit comprising a cylindrical stem for insertion in the cored opening of the fruit and an arcuate trimming blade on one side of the stem fixed on the latter in spaced relation and extending part way across the stem and inclined away from the stem axis in the direction of movement of the fruit.

3. A device for trimming and slicing fruit comprising a plurality of slicing blades extending radially from a center and a trimming blade on one side of said center in the form of an arc for trimming the fruit at one side of the core.

4. A device for trimming and slicing cored fruit comprising a stem for insertion in the cored opening in the fruit, a plurality of slicing blades fixed radially on said stem, and a trimming blade on one side of the stem and spaced therefrom in the form of a circular arc for trimming one side of the cored opening in the fruit.

5. A device for trimming and slicing cored fruit comprising a plurality of slicing blades extending radially from a common axis, and a blade for trimming a side of the cored opening in the fruit arranged in the form of a concentric arc connecting certain of said slicing blades on one side of said axis and inclined away from the latter in the direction of movement of the fruit.

6. A device for trimming and slicing cored fruit comprising a cylindrical stem adapted to fit the cored opening in the fruit, a plurality of radially extending slicing blades carried by said stem, and a trimming blade arranged in a circular arc on one side of said stem in spaced relation therewith and inclined away from the same in the direction of movement of the fruit for trimming one side of the cored opening in the latter.

THOMAS WHITTAM.